(12) United States Patent
Bhattacharya et al.

(10) Patent No.: US 6,738,226 B1
(45) Date of Patent: May 18, 2004

(54) ADHESIVE CONTROL FEATURES FOR DISC DRIVE HEAD SUSPENSION AND FLEX CIRCUIT INTERCONNECT

(75) Inventors: Sandeepan Bhattacharya, Bloomington, MN (US); Shri Hari Narayan, Minneapolis, MN (US); Rich Lawrence Segar, Eagan, MN (US); Keefe Michael Russell, Robbinsdale, MN (US)

(73) Assignee: JPMorgan Chase Bank, New York, NY (US)

( * ) Notice: Subject to any disclaimer, the term of this patent is extended or adjusted under 35 U.S.C. 154(b) by 442 days.

(21) Appl. No.: 09/631,530

(22) Filed: Aug. 3, 2000

Related U.S. Application Data

(60) Provisional application No. 60/176,516, filed on Jan. 13, 2000.

(51) Int. Cl.$^7$ ................................................. G11B 5/48
(52) U.S. Cl. .................................................. 360/245.9
(58) Field of Search ........................... 360/245.4, 245.8, 360/245.9, 245.2, 244.9; 29/603.03, 603.04, 603.06, 603.07

(56) References Cited

U.S. PATENT DOCUMENTS

| | | |
|---|---|---|
| 3,946,166 A | 3/1976 | Wossidlo |
| 4,099,211 A | 7/1978 | Hathaway |
| 4,160,184 A | 7/1979 | Ljung |
| 4,187,452 A | 2/1980 | Knappe et al. |
| 4,216,505 A | 8/1980 | Grant et al. |
| 4,339,812 A | 7/1982 | Goto |
| 4,374,402 A | 2/1983 | Blessom et al. |
| 4,408,238 A | 10/1983 | Hearn |
| 4,429,261 A | 1/1984 | Ohno |
| 4,516,177 A | 5/1985 | Moon et al. |
| 4,592,037 A | 5/1986 | Ohnuki |

(List continued on next page.)

*Primary Examiner*—A. J. Heinz
*Assistant Examiner*—Mark Blouin

(57) ABSTRACT

The present invention provides a system, method and apparatus for controlling the coverage of an adhesive bond area between a suspension and a flex circuit interconnect by etching an area of the suspension to create a bonding area. The etching process prevents bonding of the flex circuit interconnect to the suspension in a tail and a side region allowing movement between the flex circuit and suspension, wherein the movement dampens a first torsion resonance mode. Better control of the bonding area between the interconnect and the suspension using the "adhesive down" helps reduce the variation in the roll stiffness of the suspension thereby reducing the fly height variation.

21 Claims, 5 Drawing Sheets

U.S. PATENT DOCUMENTS

| | | | |
|---|---|---|---|
| 4,614,986 | A | 9/1986 | LaBudde |
| 4,754,353 | A | 6/1988 | Levy |
| 4,760,478 | A | 7/1988 | Pal et al. |
| 4,774,610 | A | 9/1988 | Kinjo |
| 4,782,476 | A | 11/1988 | Sekimoto et al. |
| 4,796,122 | A | 1/1989 | Levy et al. |
| 4,828,403 | A | 5/1989 | Schwartzman |
| 4,855,851 | A | 8/1989 | Radwan et al. |
| 4,875,117 | A | 10/1989 | Slezak et al. |
| 4,991,045 | A | 2/1991 | Oberg |
| 5,027,241 | A | 6/1991 | Hatch et al. |
| 5,115,363 | A | 5/1992 | Khan et al. |
| 5,177,640 | A | 1/1993 | Grassens |
| 5,185,683 | A | 2/1993 | Oberg et al. |
| 5,189,660 | A | 2/1993 | Caldwell |
| 5,208,712 | A | 5/1993 | Hatch et al. |
| 5,377,060 | A | 12/1994 | Nigam |
| 5,381,288 | A | 1/1995 | Karam, II |
| 5,408,372 | A | 4/1995 | Karam, II |
| 5,471,734 | A | 12/1995 | Hatch et al. |
| 5,481,144 | A | 1/1996 | Dunfield et al. |
| 5,483,397 | A | 1/1996 | Gifford et al. |
| 5,483,398 | A | 1/1996 | Boutaghou |
| 5,491,598 | A | 2/1996 | Stricklin et al. |
| 5,510,940 | A | 4/1996 | Tacklind et al. |
| 5,535,074 | A | 7/1996 | Leung |
| 5,543,973 | A | 8/1996 | Moriyama |
| 5,570,261 | A | 10/1996 | Frater et al. |
| 5,598,306 | A | 1/1997 | Frees et al. |
| 5,598,307 | A | 1/1997 | Bennin |
| 5,621,590 | A | 4/1997 | Pace et al. |
| 5,657,187 | A | 8/1997 | Hatch et al. |
| 5,675,452 | A | 10/1997 | Nigam |
| 5,734,525 | A | 3/1998 | Girard |
| 5,739,984 | A | 4/1998 | Eckberg |
| 5,748,578 | A | 5/1998 | Schell |
| 5,774,974 | A | 7/1998 | Dunfield et al. |
| 5,781,379 | A | 7/1998 | Erpelding et al. |
| 5,873,159 | A * | 2/1999 | Arya et al. .............. 29/603.03 |
| 6,282,063 | B1 * | 8/2001 | Coon ...................... 360/245.3 |

\* cited by examiner

ADHESIVE CONTROL FEATURES FOR DISC DRIVE HEAD SUSPENSION AND FLEX CIRCUIT INTERCONNECT

RELATED APPLICATIONS

This application claims priority of U.S. provisional application Ser. No. 60/176,516 filed Jan. 13, 2000.

FIELD OF THE INVENTION

This invention relates to a suspension system and, more particularly, a suspension system having partial etched areas to limit and control the adhesive coverage between a flex circuit interconnect and the suspension.

BACKGROUND OF THE INVENTION

Today the demand for high performance, low cost and nonvolatile information storage systems is ever increasing. There are a variety of information storage systems with varying degrees of development and commercialization, including magnetic tape drives, magnetic hard disc drives, magnetic floppy disc drives, magnito-optic (MO) disc drives, phasechange optic disc drives, semiconductor flash memory, magnetic random access memory (RAM), and holographic optical storage. To date, magnetic information storage technology, (hard disc, floppy disc and tape drives) is most widely used.

Direct access storage devices (DASD), or disc drives, store information on concentric tracks of an erodable magnetic recording disc. A magnetic head or transducer element is moved from track to track to record and read the desired information. Typically, the magnetic head is positioned on an air bearing slider which flies above the surface of the disc as the disc rotates. A suspension assembly connects the slider to a rotary or linear actuator. The suspension provides support for the slider.

The suspension must be flexible and provide a biased force in the vertical direction. This is necessary to provide a compensating force to the lifting force of the air bearing in order to keep the slider at a correct height above the disc. Also, the vertical flexibility is needed to allow the slider to be loaded and unloaded away from the disc. Further, the suspension must be rigid in the lateral direction. This is needed to prevent the head from moving from side to side, which will result in the head reading the wrong track. Further yet, the suspension must have a frequency response that satisfies the requirements of a disc drive system. A desirable frequency response consists of resonances high in frequency and low in gain. The present suspension systems typically use flanged load beams which exhibit undesirable low frequency bending, and sway modes. This is especially true where the flange height of the suspension is relatively small.

Systems employing dampening methods have been in use for quite some time. Several such dampening methods are disclosed in Pal et al., U.S. Pat. No. 4,760,478; Erpelding et al., U.S. Pat. No. 5,781,379, and Gifford et al., U.S. Pat. No. 5,483,397. However, the problem with all of these methods is that the use of adhesive is not confined to a predetermined area and may not aid in dampening of a first torsion resonance mode.

Resonance is inherent in mechanical structures. The impact of resonance must be minimized in disc drives. A resonance mode may be caused by the high speed rotation of the discs, actuation of the suspension using the coil motor, and air disturbances, created by high spinning disc speeds, against the suspension. Whenever these resonance modes become excited, they cause large gains or high offsets of the slider thereby causing a loss of a signal. A head-gimbal assembly (HGA) first torsion mode mechanical resonance results in significant drive level yield loss. HGA roll stiffness variation is a significant contribution to fly height sigmas in disc drives, which in turn directly impacts the drive yield. Reduction in roll stiffness variation is critical to reduction of fly height sigmas. Both of these issues have been attributed to an excessive bonding area between the flex circuit interconnect and the suspension in the HGA.

HGA's of the prior art are designed without adhesive control features. An adhesive used to bond the interconnect to the suspension is dispensed in an etched area of the suspension until it is full. Because there are no adhesive control features, in many cases the adhesive overflows into unwanted areas such as in a "forward glue dot" area thereby bonding the flex circuit interconnect in this unwanted area. Further, the adhesive being used usually is a high viscosity material. Thus, bonding the flex circuit interconnect in the forward glue dot area results in increased roll stiffness of the HGA which directly impacts its fly height performance in the drive.

Present suspension systems have a problem in achieving low enough pitch and roll stiffness for the air bearing flying height tolerances while at the same time achieving high enough lateral stiffness to prevent relative motion between the slider and the supporting end of the suspension. Some sliders may even attempt to compensate for irregularities in manufacture and operation by pitching and/or rolling slightly to maintain the air bearing.

However, the current suspension design and the lack of adhesive control allow for very poor control of the flex circuit interconnect/suspension bonding area. This results in the adhesive being dispensed on the suspension in the "forward glue dot" area of the suspension resulting in a higher roll stiffness. Also, the first torsion gains are increased due to the increased amount of interconnect to suspension bonding which in turn reduces the vibrations of the unbonded portions of the interconnect. These vibrations are effective in dampening the suspension vibrations in the first torsion resonance mode.

It can be seen that there is a need to reduce the first torsion gains in a suspension system.

It can also be seen that there is a need to limit and control the adhesive coverage between the flex circuit interconnect and the suspension.

SUMMARY OF THE INVENTION

To overcome the limitations in the prior art described above, and to overcome other limitations that will become apparent upon reading and understanding the present specification, the present invention generally discloses a suspension system and, more particularly, a suspension system having an adhesive control feature.

The present invention solves the above-described problems by limiting and controlling the bonding area between the flex circuit interconnect and the suspension thereby reducing gains in the first torsion resonance mode and reducing roll stiffness.

A method in accordance with the principles of the present invention provides a bonding surface located on a first side of the suspension. An etched area surrounding the bonding surface, wherein the etched area is recessed with reference to the bonding surface.

The bonding area between the flex circuit interconnect and the suspension terminates at the etched portion of the suspension. This bonding area terminates because the flex circuit interconnect does not contact the bonding surface of the suspension in the etched areas. These etched areas are generally referred to as adhesive dams.

Other embodiments of a system in accordance with the principles of the invention may include alternative or optional additional aspects. One such aspect is to create a bonding surface having a cross-shaped area and island-shaped area located towards a center area of the suspension. Further, the suspension includes an etched area creating a forward dam located remotely from the bonding area. The suspension also prevents bonding of the flex circuit interconnect to the suspension in a tail and a side region allowing movement between the flex circuit and suspension, wherein the movement dampens a first torsion resonance mode. In addition, adhesive bonding in specific areas may decrease the rigidity of the suspension and roll stiffness of a head-gimbal assembly.

DETAILED DESCRIPTION

Figure 1:
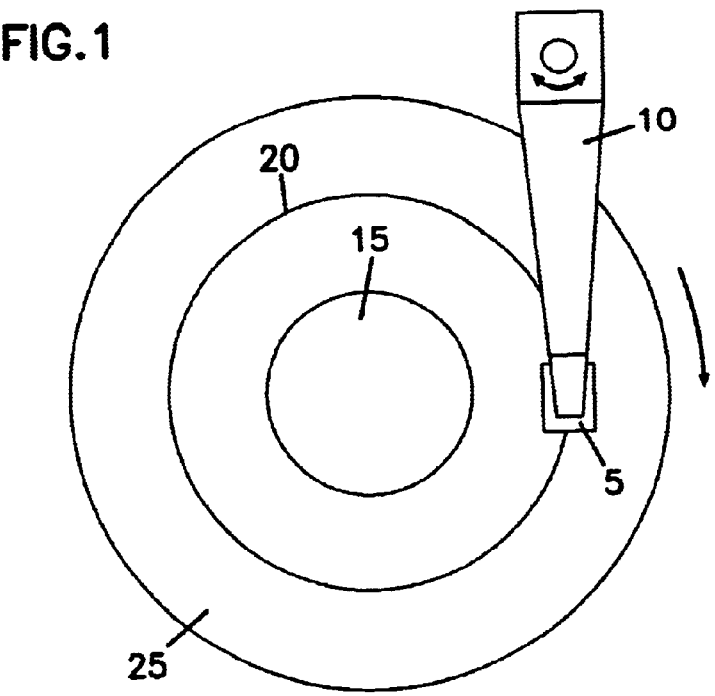
FIG. 1 illustrates a top view of a suspension system in accordance with a preferred embodiment of the present invention.

In the following description of various preferred embodiments of the invention, reference is made to the accompanying drawings in which like reference numerals represent like parts throughout the drawings. It is to be understood that embodiments other than those described herein may be utilized. Accordingly, structural and functional modifications may be made without departing from the scope and spirit of the present invention.

The present invention provides a system for a suspension and, more particularly, a suspension system having partial etched dams to limit and control the adhesive control feature to control the bonding area between the flex circuit interconnect and the suspension.

If the bonding area between the suspension and flex circuit interconnect is reduced and better controlled, it results in reduced gains in first torsion resonance mode of the head-gimbal assembly (HGA). This is because the rubbing of the unbonded flex circuit interconnect against the suspension results in reduced gains in the first torsion resonance mode. In addition, reduced roll stiffness variation is realized when the adhesive does not encroach on the HGA (therefore reducing fly height variation). This is accomplished by an innovative design of an etched feature in the suspension in conjunction with the use of a commercial adhesive such as EMCAST712-5K from Electronic Materials, Inc. of St. Peters, Mo. EMCAST712-5K is a low viscosity adhesive providing a less rigid bond between the flex circuit and the suspension.

FIG. 1 illustrates a top view of a magnetic disc drive suspension system 100 in accordance with a preferred embodiment of the present invention. A magnetic disc drive is mainly composed of four components, a slider 5 on which a read/write head (not shown) is mounted, a disc 25, a spindle 15 and a suspension 10. Each write/read head (not shown) is located on the trailing edge of the slider 5. The slider 5 is mounted to the end of the suspension 10, forming a so-called HGA. Data detection electronics and a write circuit may be located on a printed circuit board (not shown) with many very large scale integration (VLSI) chips. A mechanical server and control system, including spindle 15, actuators, suspensions 10, and control chips are used to position the slider 5 over a data track 20 on the disc's 25 recording surface. A microprocessor interface is located at one edge of a printed circuit board (now shown). The microprocessor interface provides a path to the disc drive for I/O (input/output) information.

Figure 2:
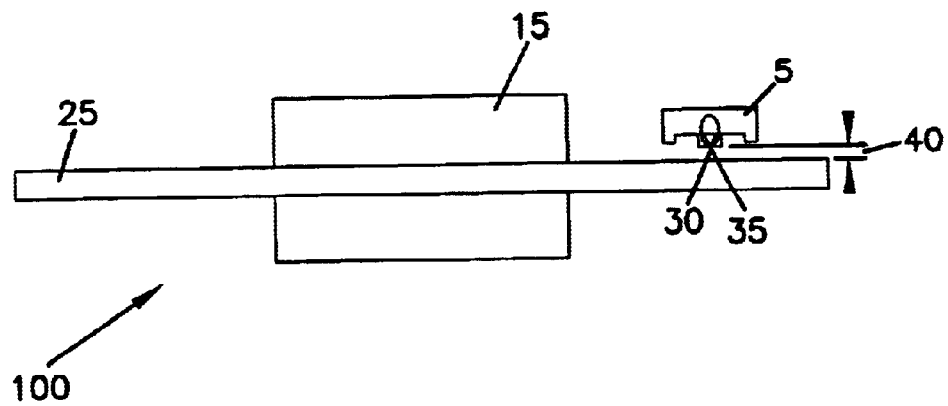
FIG. 2 is a side view of the system shown in FIG. 1.

FIG. 2 is a side view of the system shown in FIG. 1. It illustrates the operation of the head disc assembly which is based on a self-pressurized air bearing 30 between the slider 5 and the spinning disc 25, which maintains a constant separation, called the fly height 40, between them. By positioning the head-slider along the radial direction, different data tracks can be read from or written to the disc 25.

Figure 3:
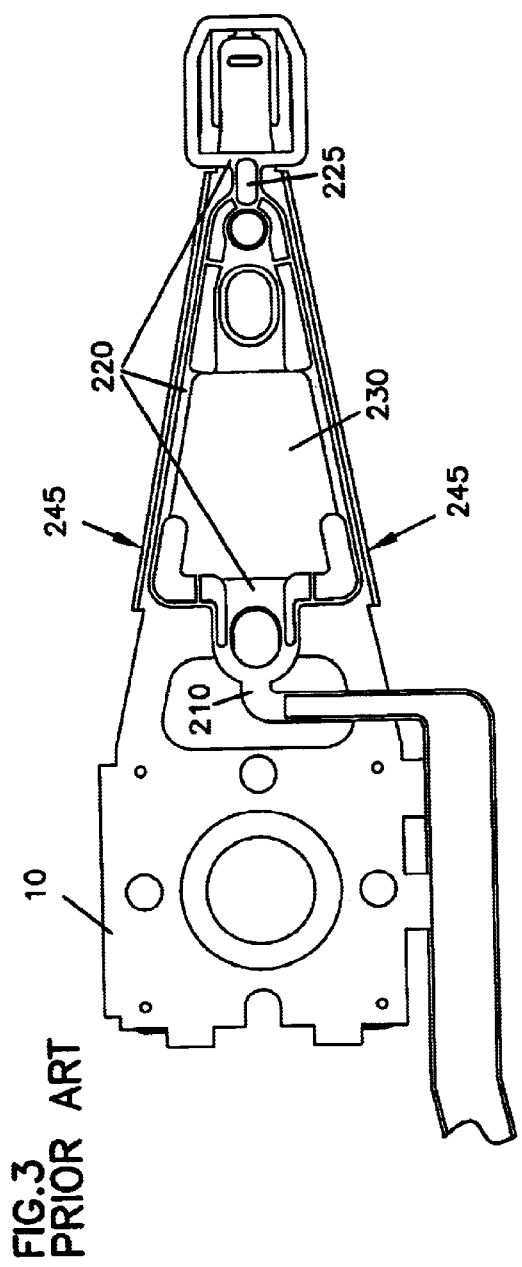
FIG. 3 illustrates a top view of a prior art design of an HGA without adhesive control features.

FIG. 3 illustrates a top view of a prior art design of an HGA without an adhesive control feature. The suspension has an etched area 230 that is trapezoidal in shape. The etched area 230 is recessed compared to the area of suspension around the etched area 230. A flex circuit interconnect 210 is coupled to the suspension 10 through an adhesive disposed in the etched area 230 of the suspension 10. The flex circuit interconnect 210 is used to couple the read/write head (not shown) located at the end of the slider to the electronics of the drive. The adhesive is dispensed in the etched area 230 of the suspension 10 until it is full. The flex circuit interconnect is then laid on the suspension and pressure is applied to bond the interconnect to the suspension. This pressure usually causes the adhesive to overflow outside the etched area 230 bonding the flex circuit interconnect 210 in unwanted areas. The adhesive being used may be of a high viscosity material and does not flow readily. The interconnect needs to be bonded down again in the forward glue dot area 225 to keep it below the rails of the suspension 245. Bonding the flex circuit interconnect 210 in the forward glue dot area 225 results in increased HGA roll stiffness which directly impacts its fly height performance in the drive.

Figure 4:
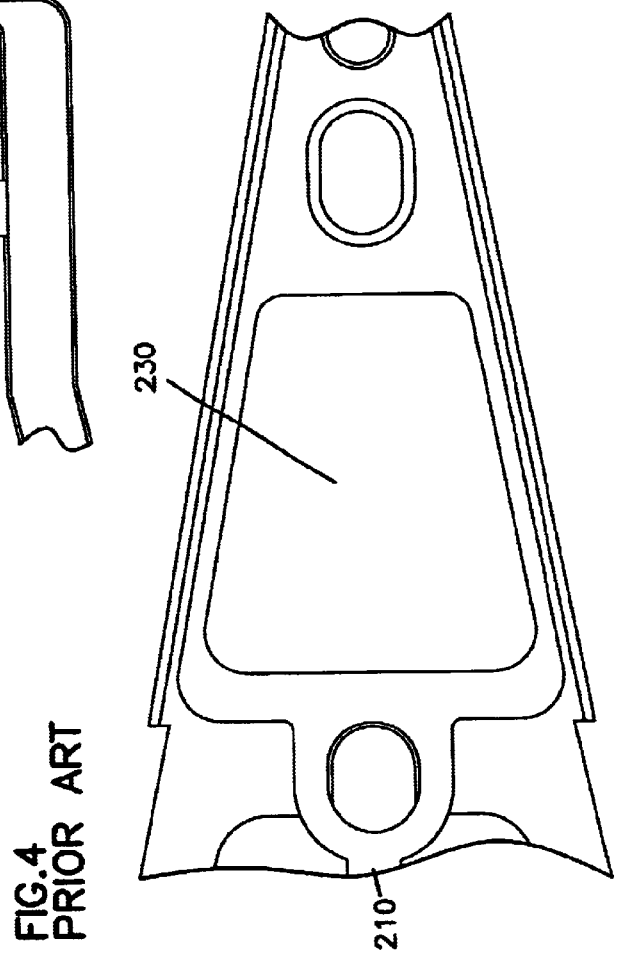
FIG. 4 illustrates the HGA shown in FIG. 3 with a non-uniform adhesive coverage according to the prior art design.

FIG. 4 illustrates the HGA shown in FIG. 3 with a non-uniform adhesive coverage according to the prior art design. Shown in gold is the flex circuit interconnect 210. An adhesive is disposed in the etched area 230 of the suspension located under the flex circuit interconnect. The adhesive coverage is not uniformly distributed, i.e., its thickness and coverage are not uniform when dispensed in the etched area 230.

The flex circuit interconnect is thus bonded to the suspension 10 over a large area. This results in increases in torsion gains because of the large bonding area which in turn reduced the vibration of the unbonded portions of the interconnect.

Figure 5:
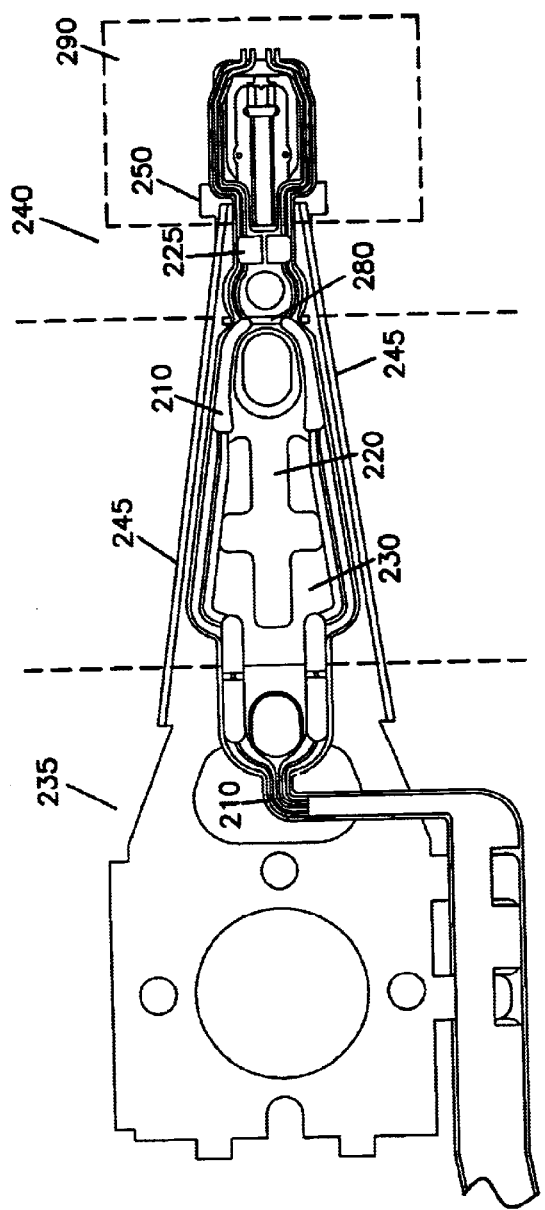
FIG. 5 illustrates one embodiment of adhesive control features on the suspension in accordance with a preferred embodiment of the present invention.

FIG. 5 illustrates a preferred embodiment of adhesive control features on a suspension 10 in accordance with the present invention. The invention introduces a structure in the suspension to physically control the adhesive coverage between the suspension 10 and a flex circuit interconnect 210. More particularly, a cross-pattern 220 is etched into the suspension. The cross-pattern 220 defines the bonding area of the suspension. Bonding does not occur in the portion surrounding the cross-pattern 220, e.g., since the etched areas 230 are recessed compared to the cross-pattern 220. The etched areas 230 act as dams and prevent the adhesive from migrating outside of the etched areas towards the tail region (preload bend region) 235 and towards areas of the suspension rails 245 that should not be bonded. The suspension rails 245 are bent up portions of the suspension 10, and are bent up perpendicular to the plane of the suspension 10. The suspension rails run lengthwise along each side of the suspension 10 between the rail region 235 and the head area 240. The dam 280 is etched in a forward portion of the suspension and extending between the side rails 245. The forward dam 280 prevents the bonding of the flex circuit 210 in the front of the suspension towards the gimbal 250 (in the head area 240) thereby reducing roll stiffness of the HGA 290 and improving fly height performance in the drive. The overall uniformity (i.e. consistency) of the bond coverage reduces roll stiffness variation and thus the fly height variation in the drive.

Overall, these features are designed to allow optimum bonding of the flex circuit interconnect 210 to the suspension 10 such that the area of the flex circuit interconnect 210 that is bonded to the suspension 10 is limited and strategically positioned. This limitation provides gain reduction in the first torsion resonance mode and, at the same time, prevents the flex circuit interconnect 210 to be raised above the suspension rails 245 and effected by forces such as air movement created by the spinning disc. For example, the resonance in the suspension 10 may cause the flex circuit interconnect 210 to rise and fall in areas where the flex circuit interconnect 210 is not bonded to the suspension 10. When the flex circuit interconnect 210 rises, it may rise higher than the suspension rails 245 and is disturbed by the air movement created by the spinning disc.

Figure 6:
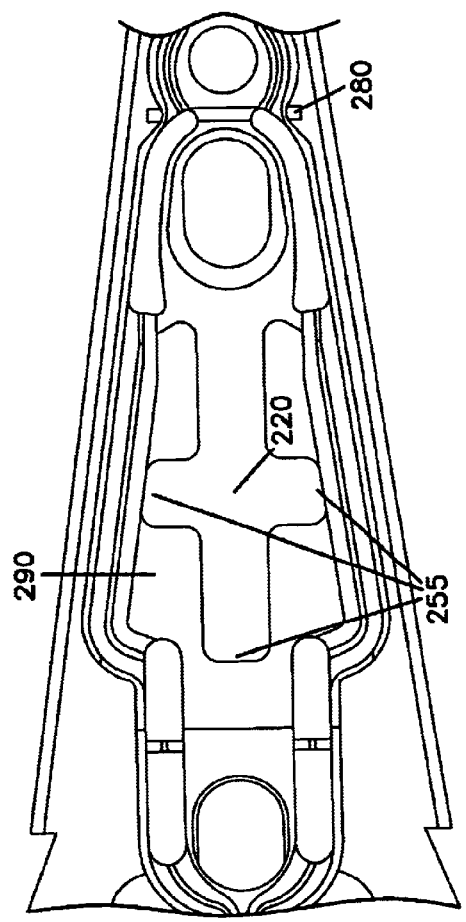
FIG. 6 illustrates a flex interconnect circuit bonded to the suspension of FIG. 5 in accordance with a preferred embodiment of the present invention.

FIG. 6 illustrates a flex circuit interconnect bonded to the suspension of FIG. 5 in accordance with a preferred embodiment of the present invention. A low viscosity adhesive is placed on the cross-pattern 220 surface and flows substantially uniformly over the cross-pattern 220 surface up to forward dam 280. Excessive adhesive may flow into the etched areas 290, but since those areas are recessed with respect to cross-pattern 220 surface, bonding of the flex circuit interconnect 210 to the suspension 10 in those etched areas 290 is prevented. Thus the flex circuit interconnect is only bonded at certain locations.

Figure 7:
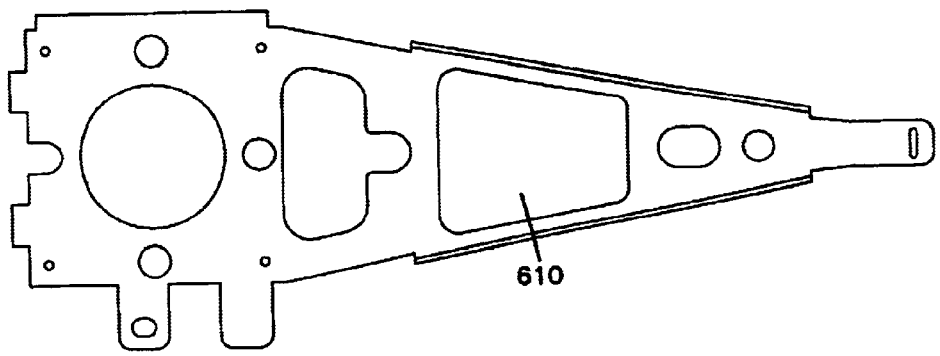
FIG. 7 illustrates the standard suspension design without adhesive control features of FIG. 3.

To understand the resonance benefits of the reduced and more controlled bonding of the flex circuit interconnect 210 to the suspension 10, a comparison of three designs will be described. FIG. 7 illustrates the standard suspension design without adhesive control features of FIG. 3. The standard design provides a partial etched area 610 wherein an adhesive may be applied. In this design, the adhesive coverage is not uniformly distributed when dispensed in the partial etch area 610, i.e., in thickness and coverage. Also, there is no control on the area over which the adhesive bonds the flex circuit interconnect 210 to the suspension 10.

Figure 8:
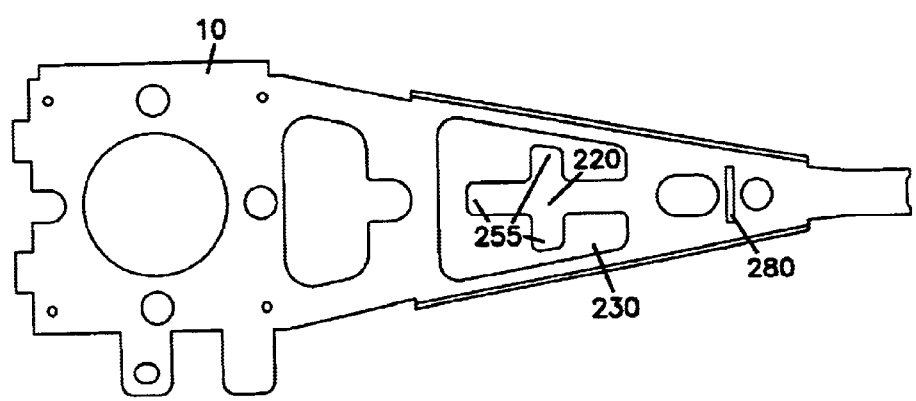
FIG. 8 illustrates one embodiment of a suspension design with an "crosspattern" adhesive control feature in accordance with the present invention.

FIG. 8 illustrates one embodiment of a suspension design in accordance with the present invention. The adhesive control feature includes the cross-pattern design, as explained in FIGS. 5–6, etched areas 255, and forward dam 280. The etched area borders 255 and dam 280 limit the area where bonding between the suspension 10 and the flex circuit interconnect 210 can occur. This is accomplished by preventing the flow of the low viscosity adhesive to unwanted areas thereby bonding a larger area of the flex circuit interconnect 210 then desired. For example, when the adhesive is applied onto the cross-pattern area 220, it will flow evenly into the etched area 230 and up into the partial etched dam 280. It will, however, be prevented from flowing past those points.

Figure 9:
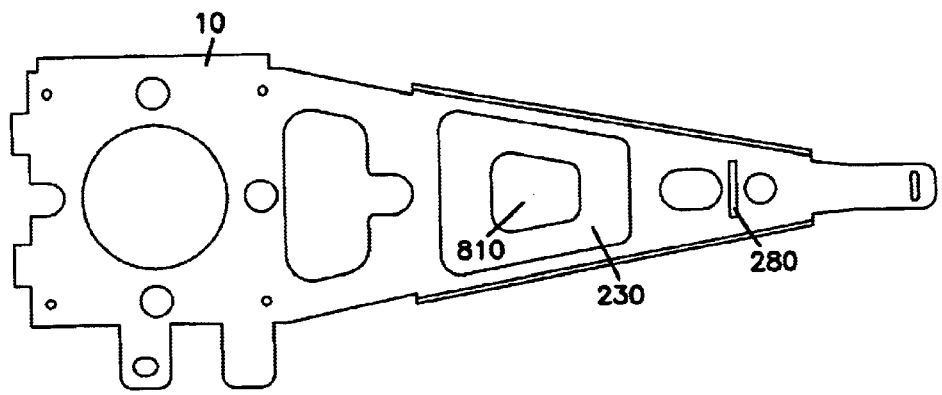
FIG. 9 illustrates a preferred embodiment of a suspension design with adhesive control features in accordance with the present invention.

FIG. 9 illustrates a preferred embodiment of a suspension design with adhesive control features in accordance with the present invention. This design, call an island pattern has an "island" 810 etched into the suspension as well as a forward dam. The island 810 is surrounded by etched area 230. As with the other design, the forward dam and etched area 230 limit the flow of the adhesive and thus the area of the interconnect that will be bonded to the suspension.

The designs of FIG. 8 and FIG. 9 illustrate preferred embodiments of the suspension 10 which aids in dampening of the resonance modes. This dampening is accomplished by the movement of a portion of the flex circuit interconnect 210 which is not bonded to the suspension 10. In FIG. 8, the flex circuit interconnect 210 is bonded to the cross-pattern area 220 and the non-etched area between area 220 and forward dam 280. In FIG. 9, the flex circuit interconnect 210 is bonded to the island pattern area 810 and the non-etched area between the area 810 and forward dam 280. Preferably, a low viscosity adhesive is used which displays elastic characteristics that aid in the dampening of the resonance modes.

Figure 10:
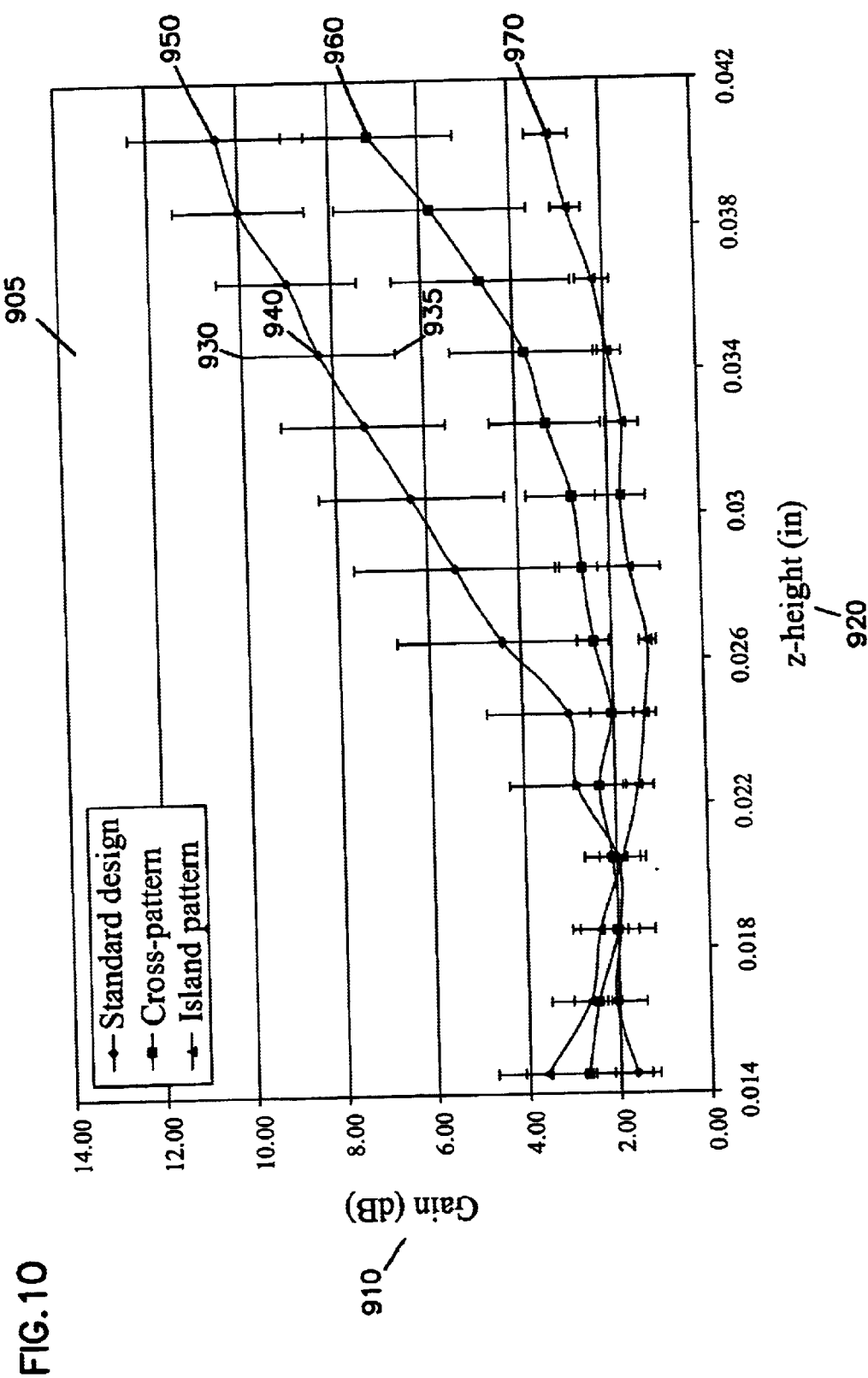
FIG. 10 illustrates a comparison of the first torsion gain variance for three designs, one without any adhesive control feature and the other two designs having different adhesive control features.

To understand the resonance performance of the different designs of suspensions, a plurality of HGAs of each of the above designs was tested on a bode tester, such as a HRT-1 bode tester (harmonics resonance test machine), for z-heights varying from 0.0145" to 0.0405" in 0.002" increments. The graph in FIG. 10 compares the average first torsion gain variation 910 with z-height 920 for the designs shown in FIGS. 7–9. The z-height 920 is dictated by the spacing between the sliders 5 in a multiple disc system.

The gain 910, as described by the graph 905, is a normalized displacement at the head area 240 of the suspension 10 with respect to the displacement at the tail area 235. This movement may be described as the amount of motion the slider 5 is experiencing as a result of the excitation at the tail area 235 of the suspension. The goal is to make the resonance gain 910 as low as possible. High gain causes the read/write head 35 to move away from the disc 25 thereby interrupting the read/write process.

The error bars 930, 935 on each of the curves show the standard deviation about the mean 940 of the corresponding z-height 920. The standard design shown in FIG. 7 has the highest first torsion gains among the three designs tested. The gains for the standard design 950 are significantly higher than those of the cross-pattern 960 shown in FIG. 8 and island pattern 970 shown in FIG. 9 designs for all z-heights 920 greater than 0.0265" (based on a 95% confidence interval). The island pattern design 970 exhibits the best performance with the lowest gains (significantly lower than those of the cross-pattern design 960 based on a 95% confidence interval) for all designs greater than 32.5 mils. The island pattern design 970 also has the lowest standard deviations of the gains for all z-heights 920. Therefore, the graph 905 shows that the gain is reduced by the movement of the unbonded FOS (flex-on-system) movement of the flex circuit interconnect 210 relative to the suspension 10 in relation to the suspension.

While the adhesive control feature has been illustrated as either a cross-pattern or island etched into the suspension, other shapes such as circles, ovals, T-shape, etc., may be etched into the suspension to provide adhesive control.

It will be clear that the present invention is well adapted to attain the ends and advantages mentioned as well as those inherent therein. While preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method of fabricating a suspension housing having an adhesive control feature between the suspension and a flex circuit interconnect, the method comprising the steps of:
   etching to form a bonding area on a first side of the suspension, the suspension having a forward region, a side region and a tail region, wherein the bonding area is located between the forward and tail region, a portion of an unetched area forms a bonding surface and the etching prevents bonding of the flex circuit interconnect in the etched area; and
   etching a forward dam near the forward region of the suspension.

2. The method of claim 1, wherein the step of etching a bonding area further comprises creating a cross-shaped bonding surface located towards a center area of the suspension.

3. The method of claim 1, wherein the step of etching a bonding area further comprises creating an island-shaped bonding surface located towards a center area of the suspension.

4. The method of claim 1, wherein the step of etching a bonding area further comprises creating an etched area having a forward dam located remotely from the bonding area.

5. A suspension having adhesive control features to limit bonding of a flex circuit interconnect to the suspension comprising:
   a bonding surface located on a first side of the suspension; and
   an etched area surrounding the bonding surface, wherein the etched area is recessed with reference to the bonding surface to substantially minimize bonding of the flex circuit interconnect in the etched area.

6. The suspension of claim 5, wherein the bonding surface includes a cross-shaped area located towards a center area of the suspension.

7. The suspension of claim 5, wherein the bonding surface includes an island-shaped area located towards a center area of the suspension.

8. The suspension of claim 5, wherein the etched area includes a forward dam located remotely from the bonding area.

9. The suspension of claim 5, wherein the etched area of the suspension prevents bonding of the flex circuit interconnect to the suspension in a tail and a side region allowing movement between the flex circuit and suspension, wherein the movement dampens a first torsion resonance mode.

10. The suspension of claim 5, wherein the etched area of the suspension further prevents adhesive bonding in a forward region, wherein preventing adhesive bonding decreases the rigidity of the suspension and roll stiffness of a head-gimbal assembly.

11. A suspension system having adhesive control features to limit bonding of a flex circuit interconnect to a suspension comprising:
    a disc drive having a plurality of head-gimbal assemblies for reading from and writing to a magnetic recording surface, each head-gimbal assembly including the suspension and the flex circuit interconnect;
    a bonding surface located on a first side of the suspension; and
    an etched area surrounding the bonding surface, wherein the etched area is recessed with reference to the bonding surface to substantially minimize bonding of the flex circuit interconnect in the etched area.

12. The suspension system of claim 11, wherein the bonding surface includes a cross-shaped area located towards a center area of the suspension.

13. The suspension system of claim 11, wherein the bonding surface includes island-shaped area located towards a center area of the suspension.

14. The suspension system of claim 11, wherein the etched area includes a forward dam located remotely from the bonding area.

15. The suspension system of claim 11, wherein the etched area of the suspension prevents bonding of the flex circuit interconnect to the suspension in a tail and a side region allowing movement between the flex circuit and suspension, wherein the movement dampens a first torsion resonance mode.

16. The suspension system of claim 11, wherein the etched area of the suspension further prevents adhesive bonding in a forward region, wherein preventing adhesive bonding decreases the rigidity of the suspension and roll stiffness of a head-gimbal assembly.

17. A suspension comprising:
    a bonding surface located on a first side of the suspension; and
    means for substantially minimizing the bonding of a flex circuit interconnect to the suspension.

18. The suspension of claim 17 wherein the means for substantially minimizing comprises an etched area surrounding the bonding surface wherein the etched area is recessed with reference to the bonding surface.

19. The suspension of claim 18 wherein the bonding surface includes a cross-shaped area located towards a center area of the suspension.

20. The suspension of claim 18 wherein the bonding surface includes an island-shaped area located towards a center area of the suspension.

21. A head gimbal assembly for a disc drive comprising:
    an interconnect;
    a suspension; and
    a bonding surface which provides more uniform bond coverage between the suspension and the interconnect thereby reducing roll stiffness variation and fly height variation in the disc drive, wherein an etched area surrounding the bonding surface is recessed with reference to the bonding surface to substantially minimize bonding of the interconnect in the etched area.

* * * * *

UNITED STATES PATENT AND TRADEMARK OFFICE
CERTIFICATE OF CORRECTION

PATENT NO. : 6,738,226 B1
DATED : May 18, 2004
INVENTOR(S) : Bhattacharya et al.

It is certified that error appears in the above-identified patent and that said Letters Patent is hereby corrected as shown below:

Title page,
Item [73], Assignee, please change "JP Morgan Chase Bank, New York, NY (US)" to
-- Seagate Technology LLC, Scotts Valley, CA (US) --

Signed and Sealed this

Tenth Day of August, 2004

JON W. DUDAS
*Acting Director of the United States Patent and Trademark Office*